(12) United States Patent
Kitzinger et al.

(10) Patent No.: US 11,260,571 B2
(45) Date of Patent: Mar. 1, 2022

(54) APPARATUS AND METHOD FOR HEATING PLASTIC PREFORMS WITH CONTROLLABLE HEATING POWER

(71) Applicant: KRONES AG, Neutraubling (DE)

(72) Inventors: Thomas Kitzinger, Regensburg (DE); Dieter Finger, Neutraubling (DE)

(73) Assignee: KRONES AG, Neutraubling (DE)

( * ) Notice: Subject to any disclaimer, the term of this patent is extended or adjusted under 35 U.S.C. 154(b) by 51 days.

(21) Appl. No.: 16/642,550

(22) PCT Filed: Sep. 7, 2018

(86) PCT No.: PCT/EP2018/074185
§ 371 (c)(1),
(2) Date: Feb. 27, 2020

(87) PCT Pub. No.: WO2019/048628
PCT Pub. Date: Mar. 14, 2019

(65) Prior Publication Data
US 2021/0078235 A1    Mar. 18, 2021

(30) Foreign Application Priority Data
Sep. 7, 2017 (DE) .................. 10 2017 120 634.5

(51) Int. Cl.
*B29C 49/78* (2006.01)
*B29C 49/64* (2006.01)
(Continued)

(52) U.S. Cl.
CPC .............. *B29C 49/06* (2013.01); *B29C 49/36* (2013.01); *B29C 49/12* (2013.01); *B29C 49/786* (2013.01);
(Continued)

(58) Field of Classification Search
CPC .................... B29C 49/786; B29C 49/6445
See application file for complete search history.

(56) References Cited

U.S. PATENT DOCUMENTS 7,745,512 B2   6/2010  Xia et al.
2006/0157896 A1  7/2006  Lee et al.
(Continued)

FOREIGN PATENT DOCUMENTS

AT            521 U1    12/1995
DE      102009015519 A1  10/2010
(Continued)

OTHER PUBLICATIONS

International Search Report dated Dec. 13, 2018 for PCT/EP2018/074185.
(Continued)

*Primary Examiner* — Robert B Davis
(74) *Attorney, Agent, or Firm* — Schmeiser, Olsen & Watts, LLP

(57) ABSTRACT

Provided is an apparatus for heating plastic preforms, with a transport device which transports the plastic preforms along a predefined transport path, wherein this transport device has a plurality of holding elements for holding the plastic preform, and with at least one first heating section which is arranged along the transport path, and at least one second heating section which is arranged along the transport path downstream of the first heating section, wherein the heating sections each include a plurality of independently controllable heating elements which allow heating of the plastic preforms in several heating zones, lying above each other in the longitudinal direction of the plastic preforms, with a temperature profile which changes in the longitudinal
(Continued)

Figure 3:
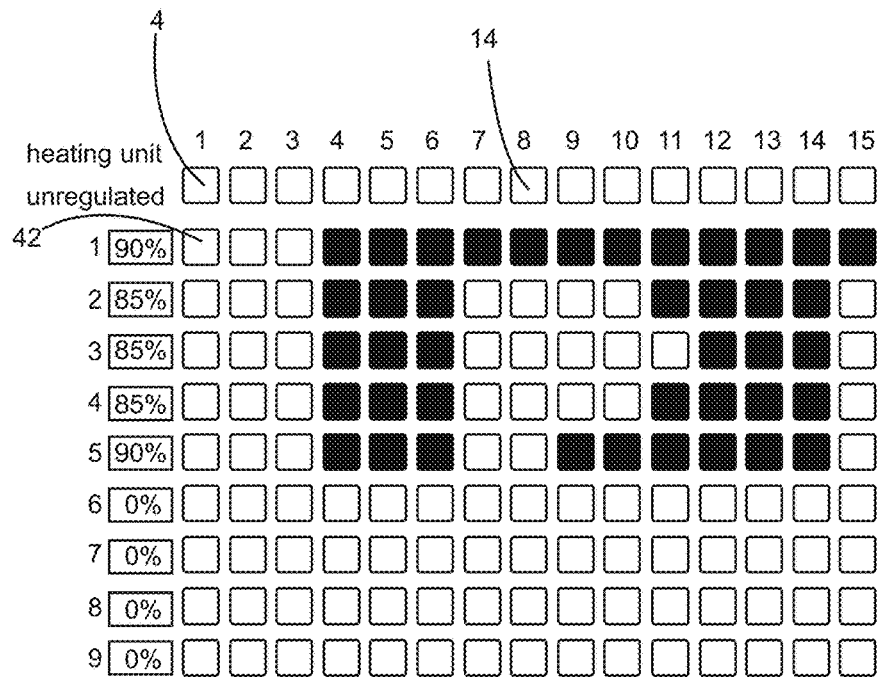

direction of the plastic preforms, wherein the apparatus includes a control device for controlling these heating sections.

19 Claims, 3 Drawing Sheets

(51) Int. Cl.
    *B29C 49/06*     (2006.01)
    *B29C 49/36*     (2006.01)
    *B29C 49/12*     (2006.01)
    *B29C 49/20*     (2006.01)
    *B29C 49/46*     (2006.01)
    *B29L 31/00*     (2006.01)

(52) U.S. Cl.
    CPC ............ *B29C 2049/2095* (2013.01); *B29C 2049/4697* (2013.01); *B29L 2031/7158* (2013.01)

(56) References Cited

U.S. PATENT DOCUMENTS

| | | | |
|---|---|---|---|
| 2007/0066714 A1 | 3/2007 | Xia et al. | |
| 2009/0108505 A1* | 4/2009 | Steiner | B29C 49/78 264/535 |
| 2010/0314806 A1 | 12/2010 | Haesendonckx | |
| 2011/0291332 A1* | 12/2011 | Voth | B29B 13/024 264/532 |
| 2019/0134879 A1* | 5/2019 | Schoenberger | B29C 49/78 |

FOREIGN PATENT DOCUMENTS

| | | | |
|---|---|---|---|
| DE | 102009026259 A1 | 2/2011 | |
| DE | 102009047541 A1 | 6/2011 | |
| DE | 102010021445 A1 | 12/2011 | |
| DE | 102015122106 A1 | 6/2017 | |
| EP | 2390082 A1 | 11/2011 | |
| GB | 2095611 A * | 10/1982 | ......... B29C 49/6418 |
| WO | 2012172250 A1 | 12/2012 | |

OTHER PUBLICATIONS

Datenblatt Universalregler Eurotherm.
Bedienungsanleitung Universalregler Eurotherm.

* cited by examiner

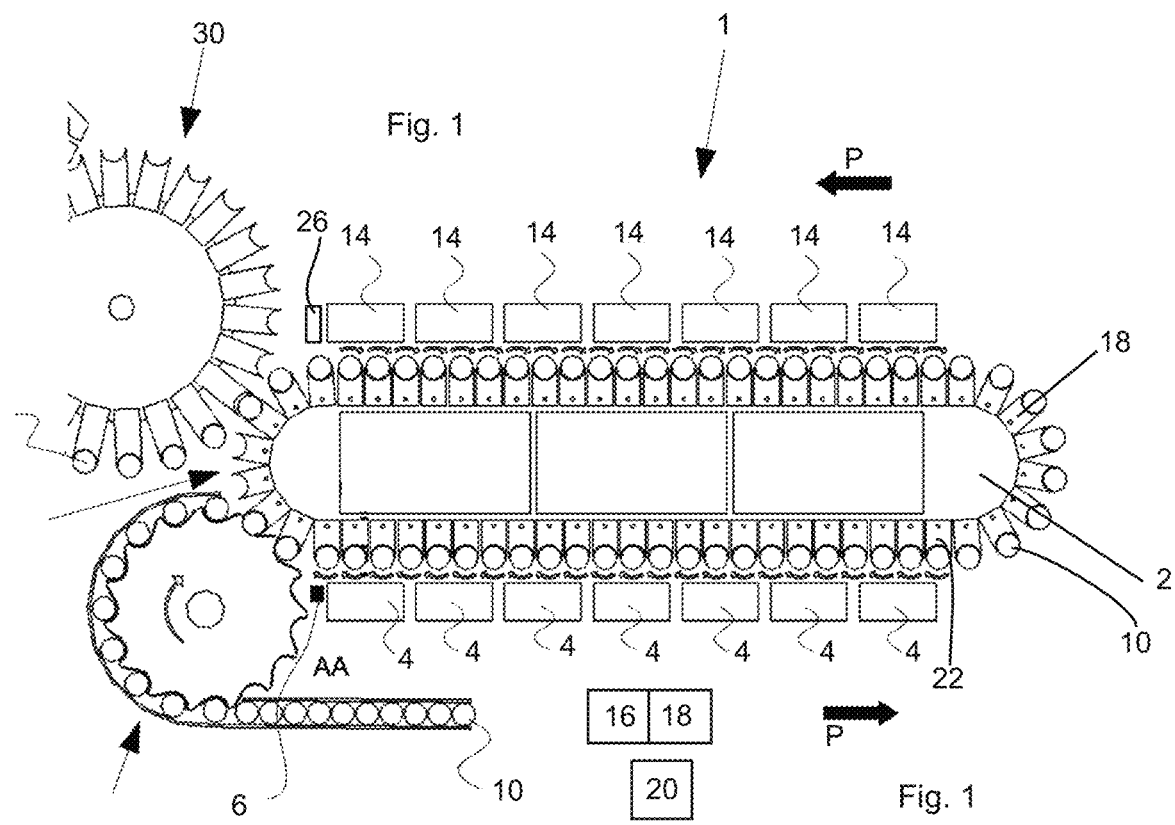
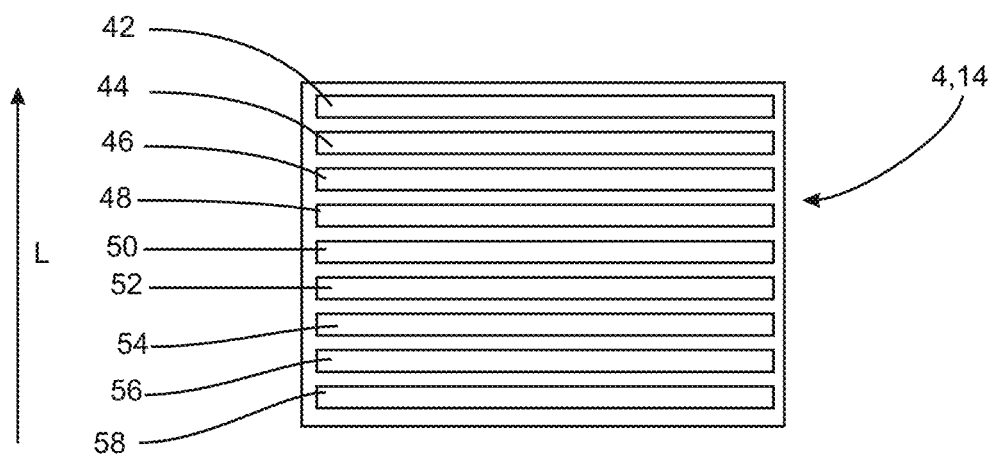

APPARATUS AND METHOD FOR HEATING PLASTIC PREFORMS WITH CONTROLLABLE HEATING POWER

CROSS-REFERENCE TO RELATED APPLICATIONS

This application claims priority to PCT Application No. PCT/EP2018/074185, having a filing date of Sep. 7, 2018, based on German Application No. 10 2017 120 634.5, having a filing date of Sep. 7, 2017, the entire contents both of which are hereby incorporated by reference.

FIELD OF TECHNOLOGY

The following relates to an apparatus and a method for heating plastic preforms. In the drinks production industry, it is normal for plastic preforms to be first heated and then molded into plastic containers, such as plastic bottles, by a molding process, such as for example a stretch blow-molding process. Even during heating of the plastic preforms, usually a profiling of the heating may be applied, for example in a longitudinal direction of the plastic preforms.

BACKGROUND

Accordingly, such heating devices of stretch blow-molding machines normally have a specific number of heating units which are arranged successively in a running direction of the plastic preforms. Each of these heating units comprises a plurality of heating devices arranged above each other, such as e.g. lamps which create the profiling as the plastic preforms pass by, i.e. individual regions (lying above each other in the longitudinal direction of the plastic preforms) or layers of the plastic preforms may be tempered or heated differently. This tempering then allows control of the material distribution during the subsequent stretch blow-molding process.

It is known from the internal conventional art of the applicant that each heating element, e.g. each lamp, in a lamp matrix may be switched on individually, wherein heating units are depicted on a user interface in the X direction and the individual lamps of a heating unit in the Y direction. In this case, the user can in targeted fashion select individual heating elements such as heating lamps. A specific energy input into one layer therefore results both from the number of powered lamps of a layer, and also from a percentage value with which all lamps of for example one layer can in turn be weighted. In addition, with the apparatus already known internally by the applicant, it is also known to provide a higher-level temperature controller, the correcting variable of which tracks the entire lamp field, i.e. both in the X and Y directions. For all lamps of a specific layer, the following lamp power therefore applies:

$$P_{Lamp\_y} = P_{nom\_y} * \%_{Temperature\_controller} * \%_{Layer\_y}$$

wherein Y=layer of the above-mentioned individual layers, for example values from 1 to 9.

$$E_y = P_{nom\_y} * \%_{Temperature\_controller} * \%_{Layer\_y} * \Sigma On_X * t$$

wherein X designates the respective heating device, or more precisely the respective heating section, and is counted sequentially from 1 to n; y designates the region or layer; and t the time spent in front of each individual heating section (in this way, a specific heating section can also be assigned to a heating device). $E_Y$ designates the energy quantity emitted by a heating device during passage of a plastic preform, or the energy which is radiated onto the respective layer of the plastic preform. In order to determine from this the energy input into the individual plastic preform, in addition the proportion of the power active for heating of an individual plastic preform must be taken into account.

Thus, the lamp matrix described here requires a great many user inputs, so that the process development is complex and can in some cases only be performed by specially trained personnel. In addition, variances are frequently possible. Thus, for example it would be possible, with few activated lamps of a layer, to distribute the remaining lamps over the entire oven length or activate these rather at the beginning or at the end. This in turn further complicates the process development and also leads to different process engineers finding different recipes.

SUMMARY

An aspect relates to an apparatus and a method which in particular is easier to operate.

An apparatus according to embodiments of the invention for heating plastic preforms has a transport device which transports the plastic preforms along a predefined transport path. The transport device has a plurality of holding elements for holding the plastic preforms. Furthermore, at least one first heating section is provided which is arranged along the transport path, and at least one second heating section which is also arranged along the transport path downstream of the first heating section. Here, the heating sections each comprise a plurality of independently controllable heating elements which allow heating of the plastic preforms in several heating zones, lying above each other in the longitudinal direction of the plastic preforms, with a temperature profile which changes in the longitudinal direction of the plastic preforms. Furthermore, the apparatus comprises a control device for controlling these heating sections.

According to embodiments of the invention, the apparatus has an input device via which a user can predefine at least one set value for a heating process and/or the individual heating zones, and a processor device and/or a control device is provided which automatically actuates the individual heating elements taking account of this set value.

Whereas in the conventional art it is proposed that the user can activate or deactivate the individual heating elements, embodiments of the invention proposes that the user merely applies a set profile or for example a temperature specification, and the processor device then automatically calculates whether and how many heating elements, e.g. heating lamps, must be activated in which layers. Embodiments of the invention are based on the fact that a specific energy input into a layer also results from the number of activated lamps of a layer, for example multiplied by the percentage value of the layer. This means that the same result could also be achieved by deactivating lamps or by reducing a percentage value. Thus, it is no longer—as before—the individual operations for the plastic preforms which are predefined, but a set value for the heating to be achieved.

In preferred embodiments, the set values or predefinable set values are values which are characteristic of an absolute or relative (in particular percentage) zone power level, and/or the set values are absolute or relative (percentage) zone power levels, or values which are characteristic of these zone power levels.

In further preferred embodiments, the apparatus comprises a processor device which is suitable and intended for determining the optimal set values of the individual heating elements for achieving a lamp service life which is as long as possible. This processor device may have an algorithm which performs corresponding calculations.

In further preferred embodiments, the processor device and/or an algorithm determines the set values of the individual heating elements which are optimal (and/or optimised) for a most energy-efficient heating profile.

In further preferred embodiments, the input device allows the input of a plurality of set values for the individual heating zones, thus the zones which serve for heating the individual regions or layers of the plastic preforms. Thus, the input device may have a keypad or touchscreen via which the user can predefine the set values. Here, it is possible that the set values are a (in particular zone-dependent) temperature of the plastic preforms. This can then be entered steplessly.

Alternatively, or additionally, it would also be possible that the set values are power values for an entire region-dependent or zone-dependent heating power.

Advantageously, the heating device is an infrared heating device, i.e. the heating sections are in particular infrared heating sections. In a preferred embodiment, the heating elements are lamps which are arranged above each other, in particular in a longitudinal direction of the plastic preforms. These heating elements or lamps also extend in the transport direction of the plastic preforms.

In further advantageous embodiments, the apparatus comprises a turning device for turning the plastic preforms relative to their longitudinal direction. Instead of infrared heating elements, microwave heating elements could also be provided.

In preferred embodiments, the apparatus comprises a device for molding the plastic preforms which is arranged downstream of the heating device.

The device for molding the plastic preforms into plastic containers is a blow-molding machine. This means that the plastic preforms are first thermally conditioned in a heating section and then expanded by bombardment with a liquid or gaseous medium. The fluid medium is pressurised. For supplying the pressurised medium, the device comprises a blowing nozzle which can be placed tightly against the mouth of the plastic preforms in order to expand the plastic preforms with liquid or gaseous medium. In addition, a valve arrangement is provided which controls the supply of the blowing air to the plastic preforms.

The blow-molding machine is a stretch blow-molding machine, which means that the preforms are stretched in the longitudinal direction by means of a stretching rod before and/or during expansion. The blowing stations each have stretching rods which can be inserted in the plastic preforms and stretch the plastic preforms in their longitudinal direction. The stretching rods have an electric drive.

In an advantageous embodiment, a plurality of blowing stations is arranged on a common movable carrier. This carrier is in particular a rotatable carrier. The blowing stations each have a blow-molding device which forms a cavity, inside which the plastic preforms can be expanded into plastic containers. These blow-molding devices are configured in multiple pieces and have two blow-mold halves and a base mold. These blow-mold halves are releasably attached to a mold carrier shell or blow-mold carrier. The blow-mold carriers are pivotable relative to each other in order to open and close the blow-molding devices. The blow-mold carrier also comprises locking mechanisms for locking the mold halves together during the blowing process.

The blow-molding machine or the carrier and the blow-molding devices are arranged inside a clean room which isolates the blow-molding machine from a non-sterile environment. Drive devices for closing, locking and/or opening the blow-molds are arranged outside the clean room.

The blow-molding devices are transported inside the clean room. The clean room is delimited by several walls. The clean room is delimited by at least one stationary wall and a wall which is movable relative to the stationary wall. The clean room isolates the blow-molds in particular from a non-sterile environment. Advantageously, the clean room is configured in the manner of a ring or torus around the blow-molding stations or molding stations and/or the transport path of the plastic containers.

In further preferred embodiments, the processor device and/or the control device or the apparatus also allows a change in transport speed of the plastic preforms.

The heating sections are arranged stationary and the plastic preforms are transported past these heating sections or heating elements.

In further advantageous embodiments, the apparatus has a measuring device for measuring a power of the individual heating elements. In a preferred embodiment, the input device allows input of a plurality of set values for the individual heating zones or layers. Thus, for example, the user can specify which temperature the plastic preforms should have in specific layers.

In preferred embodiments, the apparatus has a plurality of heating sections which are arranged successively along the transport path of the plastic preforms. For example, more than four, or more than eight, or more than ten, or more than twelve such heating sections may be provided. Advantageously, the apparatus however has fewer than 50, or fewer than 40 or particularly fewer than 30 such heating sections.

The apparatus has at least two heating elements arranged above each other in the longitudinal direction, at least three, or at least four and particularly or at least five. The heating section has fewer than 15 heating elements arranged above each other in the longitudinal direction of the plastic preforms, or fewer than 14, or fewer than 13 or particularly fewer than 12.

In further advantageous embodiments, the heating elements of each heating section can be controlled independently of each other. In this way for example, it is possible again to form a matrix, wherein for example the individual heating sections are depicted in the X direction of this matrix, and the heating elements (of each individual heating section) arranged above each other are depicted in the Y direction.

In further advantageous embodiments, the apparatus has a temperature measuring device which measures the actual temperature of the plastic preforms. The processor device controls the heating of the plastic preforms on the basis of this measured temperature. Furthermore, the apparatus has a control device which controls at least the first heating element depending on a temperature of the plastic preforms as measured by the temperature measuring device. Here, it is possible that this temperature measuring device is arranged in the region of an inlet of the plastic preforms upstream of the apparatus. It would however also be possible for such a temperature measuring device to be arranged in a middle region of the heating device.

In further advantageous embodiments, the control device controls a power of the heating elements between at least two limit values. It is known from the conventional art that the respective heating elements, for example lamps, have a power range in which they are operated favourably or durably or similar. The control device is configured such that it selects how many lamps should be operated in order to achieve these favourable operating conditions. Thus, it is provided that the individual heating elements, e.g. lamps, are operated under ideal conditions in order to achieve an energy saving.

Thus, for example it would be possible that, in the case of greater need, more lamps are operated but with lower power. The lamps are operated in a power range which lies above 30% of their nominal power, or above 40% of their nominal power, or particularly above 50% of their nominal power. The heating elements or lamps are here operated in a power range which lies below 90% or particularly below 80% of the nominal power.

In further advantageous embodiments, the apparatus comprises a second temperature measuring device which serves for measuring a temperature of the plastic preforms. Here it is possible to provide this second temperature measuring device for example at an outlet from the heating section or oven. In this way, the temperature to which the plastic preforms have been heated can be determined. Also, on the basis of the respective temperature difference, it can be determined how and, where applicable, with what power the individual heating elements should be operated.

In further advantageous embodiments, heating sections or groups of heating sections to be activated can be selected. Thus, the user can select whether for example heating sections at the beginning of the transport path should be activated, or at the end of the transport path. Also, it would be possible for the user for example to be able to select that only specific heating sections should be activated. It is also possible that the individual heating elements of the respective heating sections are activated or deactivated. For example, merely the topmost elements.

The control system described here can also avoid the risk of leaving the optimal operating point of the lamps or heating elements (both upward and downward), which could have a significant effect on the service life of the lamps.

An optimal combination of parameters (in particular quantity and position of activated lamps, and layering of the lamps) is automated. An algorithm is provided which takes account of the fact that the lamp power lies in a specific range, so that the individual heating elements or lamps are operated under optimal operating conditions.

Here it is possible that a lower and/or an upper limit value is established for the operating temperatures, and the lamp power is configured such that the lamp temperature moves inside this range. It is possible that the lamp temperature is measured, for example a base temperature of the lamps.

These optimal operating conditions may for example be a base temperature or the temperature of the glass bulb of the lamps, or these values may be taken into account. Thus, for example, the base temperature of the lamp may move within a specific temperature range between 150° C. and 450° C., or in a temperature range between 150° C. and 350° C. A temperature of the glass bulb may then lie below 900°.

A power control device is provided which controls the lamp power also taking into account the operating temperature of the lamps.

The power of the heating elements or lamps moves within a range of 20% to 100% of the nominal power, or in a range between 30% and 80% of the nominal power, so that:

$$30\% <= (P_{Lamp\_y}/P_{nom\_y}) <= 80\% \text{ or: } 30\% <= (\%_{Temperature\_controller} * \%_{Layer\_y}) <= 80\%$$

(wherein y designates the layer or region, for example from 1 to 9).

Thus, it would also be possible to select the lamp power levels separately for each individual layer.

One advantage of the procedure described here is that the former lamp matrix may be completely omitted. Secondly however, it is preferred that the lamps or heating elements activated proportionally are integrated in the layer.

Previously, the values $\%_{Layer\_Y}$ were taken into account, but now the values $$\%_{Layer\_Y} * (\Sigma On_X/total_Y) = \%_{Layer\_Y\_NEW}$$

In particular iteratively, the parameters, the percentage correcting variable and number of activated heating elements are matched to each other taking into account the region and user input.

As stated, further parameters could be the positions of the activated lamps (i.e. the individual lamps of the heating sections) over the oven length. Thus, for example, the activated lamps could be distributed evenly over the oven length, but it would however also be possible for the lamps to be switched on at the oven inlet and at the oven outlet. These parameters too may be simulated via the oven model. The decisive variables may for example be the presence and size of intermediate modules, such as for example sterilisation modules, or modules which allow different heating of the plastic preforms in the circumferential direction. Further possible parameters could be the machine speed, the temperature equalisation time, or a weight of the plastic preforms. Using the procedure described here, as a whole the process development is made simpler and the service life of the lamps can be extended. The correcting variable, as stated above, is a set temperature of the plastic preforms, and in particular a zone-specific set temperature of the plastic preforms.

Embodiments of the invention are furthermore aimed at a method for heating plastic preforms, wherein a transport device transports the plastic preforms along a predefined transport path, and wherein this transport device has a plurality of holding elements for holding the plastic preforms, and wherein at least one first heating section is arranged along the transport path, and at least one second heating section is also arranged along the transport path downstream of the first heating section. These heating sections heat the plastic preforms, wherein the heating sections each comprise a plurality of independently controllable heating elements which allow heating of the plastic preforms in several heating zones, lying above each other in the longitudinal direction of the plastic preforms, with a temperature profile which changes in the longitudinal direction of the plastic preforms, wherein a control device controls these heating sections.

It is pointed out that in the context of embodiments of the present invention, instead of the term "heating section", the term "heating device" may also be used since, as stated above, a specific heating section can be assigned to a specific heating device.

According to embodiments of the invention, the apparatus has an input device via which the user can predefine, at least temporarily, a set value for the heating process, and a processor device controls—automatically—the individual heating elements taking account of this set value. This set value is in particular an optimal and/or optimised set value of a lamp power (or a power of the respective heating elements) and/or a set value which is characteristic of the lamp power.

It is therefore proposed according to the method that the user no longer actuates individual heating elements but specifies a set value, for example a desired temperature at the outlet of the oven. It would however also be possible for this set value not to be specified by the user but by a downstream control device, for example a downstream blow-molding machine which actuates the heating device accordingly depending on the applicable process parameters.

In a preferred embodiment, the predefinable set values are the energy levels introduced into the plastic preform per zone, and/or the temperatures of the plastic preforms to be achieved per zone. In this case, the power levels are determined taking into account the energy levels to be introduced or the temperatures of the plastic preforms to be achieved per zone. It is pointed out that in the context of this application, the terms "preform" and "plastic preform" are synonymous.

In a preferred method, a temperature of the plastic preforms is measured for at least part of the time, and at least once. An actual temperature of the plastic preforms is measured, for example, measured at an outlet from the heating device. In a preferred method, the individual heating sections and in particular the individual heating elements are controlled taking into account the measured actual temperature of the plastic preforms. The temperature of the plastic preforms is measured contactlessly. In a further preferred method, the temperature of the plastic preforms is also measured as a function of a longitudinal direction of the plastic preforms. Therefore, at least one temperature measuring device is provided which allows the temperature of the plastic preforms to also be determined dependent on zone or region.

BRIEF DESCRIPTION

Figure 4:
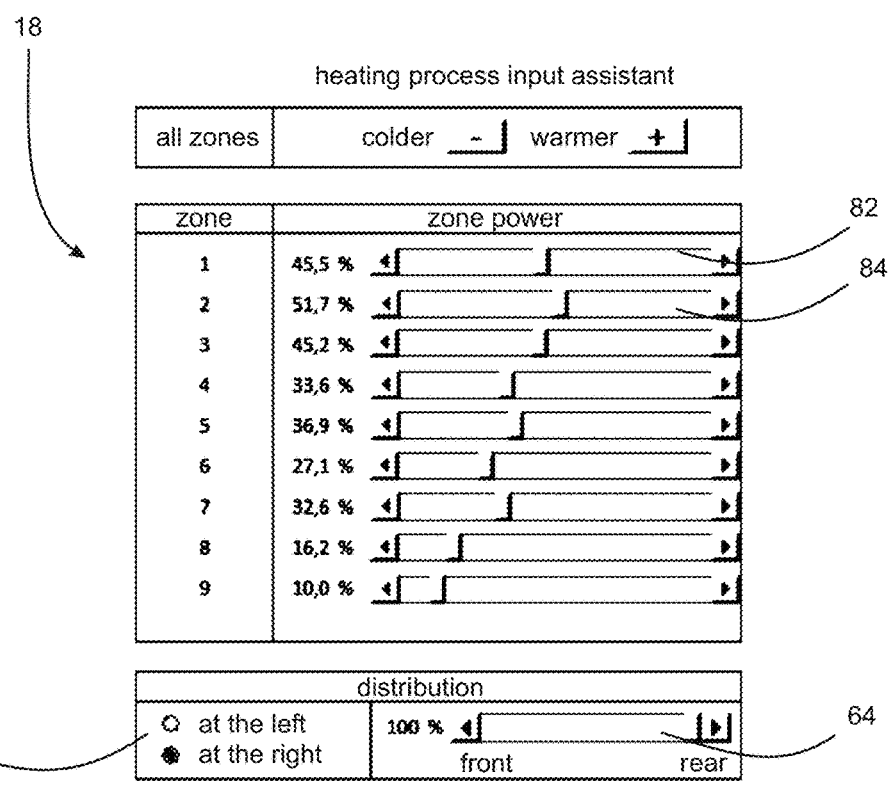
Figure 5A:
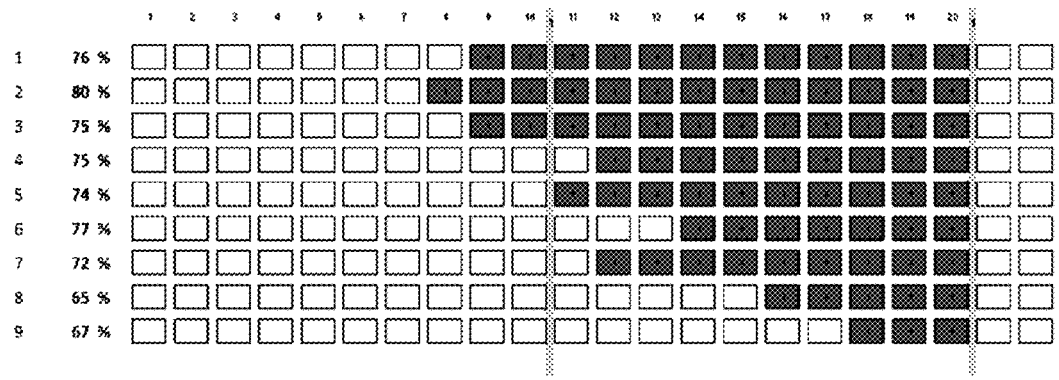
Figure 5B:
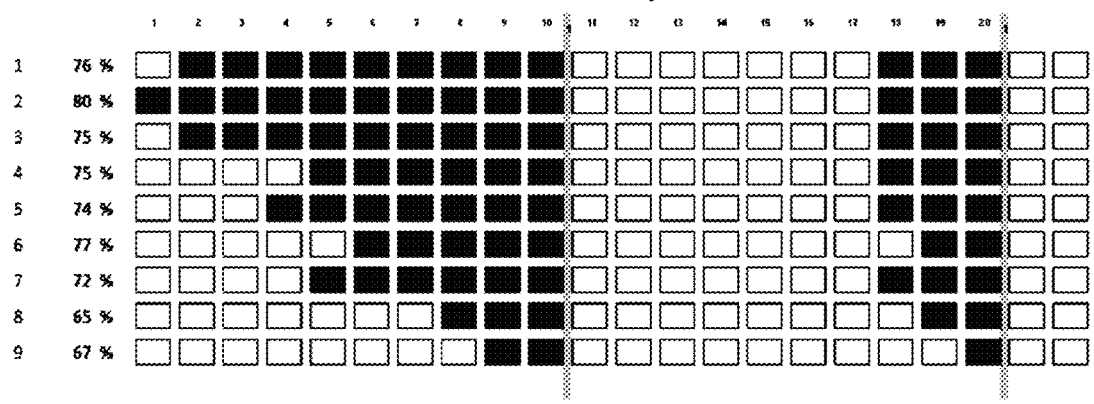

Some of the embodiments will be described in detail, with reference to the following figures, wherein like designations denote like members, wherein:

FIG. 1 a depiction of an apparatus according to embodiments of the invention for heating plastic preforms;

FIG. 2 a depiction of a heating section;

FIG. 3 a depiction of a control system according to the internal conventional art of the applicant;

FIG. 4 a depiction of input possibilities of an apparatus according to embodiments of the invention;

FIG. 5a a first illustration of implementation of a user input by the apparatus according to embodiments of the invention; and FIG. 5b a further illustration of implementation of a user input by the apparatus according to embodiments of the invention.

DETAILED DESCRIPTION

FIG. 1 shows an apparatus 1 according to embodiments of the invention for heating plastic preforms 10. The plastic preforms 10 are supplied via a supply device 12, such as for example an input star, to the actual heating device. This heating device has a transport device 2 on which a plurality of holding elements 22 is arranged. These holding elements 22 allow rotation of the plastic preforms relative to their longitudinal axes. The plastic preforms are guided along a transport path P and then delivered to a further transport device 30. A molding device for molding plastic preforms into plastic containers may adjoin the transport device 30.

Reference sign 4 refers to a plurality of heating sections arranged along a lower branch of the transport path, and reference sign 14 refers to a plurality of heating sections arranged along an upper branch of the transport device.

Reference sign 6 designates a first temperature measuring device which is here arranged at an oven inlet. Reference sign 26 designates a second temperature measuring device arranged at the end of the transport path of the plastic preforms. In addition, a further temperature measuring device may be provided, for example in a deflection region in which the plastic preforms are transferred from the lower branch to the upper branch.

Reference sign 16 designates an input device via which the user can specify which heating levels of the plastic preform he requires. This input device may for example be a touchscreen or similar.

Reference sign 18 designates a processor device which determines an actuation of the individual heating sections based on the user inputs. In addition, the apparatus has a control device 20 which is suitable and intended for actuating the individual heating lines 4 and 14.

FIG. 2 shows a diagrammatic depiction of a heating line 4, 14. A plurality of heating elements are arranged above each other in the longitudinal direction L of the plastic preforms. These heating elements are here formed as radiators 42, 44, 46, 48, 50, 52, 54, 56 and 58. These individual radiators can be operated independently of each other and in particular can also be actuated independently by the control device 20.

FIG. 3 depicts an array from the internal conventional art of the applicant. Again, a plurality of heating sections 4 and 14 is shown. These each comprise heating elements 42, 44, 46, 48, 50, 52, 54, 56 and 58 arranged above each other in the Y direction. These heating elements can be activated individually, and in particular can also be activated individually with the power levels 90%, 85% etc. shown at the left-hand edge. In the example shown in FIG. 3, the bottom four heating elements are not activated, which may be connected with the fact that shorter plastic preforms are being heated which do not protrude into the region of these bottom heating elements.

FIG. 4 shows a depiction of an input device via which the user can enter specifications for heating. The individual zones 1-9 are shown here, which correspond to the respective heating elements 42, 44, 46, 48, 50, 52, 54, 56 and 58. It is evident that, by means of input elements 82 and 84, the user can select a zone power level as a percentage. The control device or processor device then automatically determines which of the individual heating elements or heating sections shall be activated in order to achieve the desired heating or zone power level in the most favourable fashion.

In addition, an input element 62 may be provided, via which the user can select whether the heating is applied at the right or left, i.e. in which regions of the transport path the plastic preforms should be heated. Via an input element 64, the user can also establish in which region of the heating device the heating should take place.

The selection between the front and the rear allows distribution of the active heating elements over the two transport paths. In the following FIG. 5a, substantially 100% of the heating is applied via the rear, and in FIG. 5b around 30%. The choice of left or right however indicates the orientation on the respective side.

Heating at the right means that the energy is introduced at a time which is as late as possible (this is advantageous e.g. with thin-walled preforms so as not overheat them). Heating at the left means that the energy is introduced early, and there is then sufficient equalisation time available for the temperature to be distributed over the wall thickness of the plastic preforms (this may be necessary for thick-walled plastic preforms or coloured plastic preforms).

FIG. 5a shows an embodiment in which heating takes place in particular in an end region of the heating section. It is evident here that, in particular, the heating units or heating sections 9-20 are activated. In this case, it was desired that the plastic preforms should be heated in particular towards the end of their transport path.

In the embodiment shown in FIG. 5b, it was desired for heating to take place mainly in the first region of the heating section, but then also in an end portion of the heating section. Accordingly, the heating sections or heating units 1-10 are activated here, and secondly again heating sections 18-20.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 Apparatus according to an embodiment of the invention
2 Transport device
4 Heating section
6 First temperature measuring device
10 Plastic preforms
12 Supply device
14 Heating section
16 Input device
18 Processor device
20 Control device
22 Holding element
26 Second temperature measuring device
30 Transport device
42, 44, 46 Radiator, heating element
48, 50, 52 Radiator, heating element
54, 56, 58 Radiator, heating element
62, 64 Input element
82, 84 Input element
L Longitudinal direction of plastic preforms
P Transport path

The invention claimed is:

1. An apparatus for heating plastic preforms, with a transport device which transports the plastic preforms along a predefined transport path, wherein this transport device has a plurality of holding elements for holding the plastic preforms, and with at least one first heating section which is arranged along the transport path, and at least one second heating section which is arranged along the transport path downstream of the first heating section, wherein the heating sections each include a plurality of independently controllable heating elements which allow heating of the plastic preforms in several heating zones, lying above each other in the longitudinal direction of the plastic preforms, with a temperature profile which changes in the longitudinal direction of the plastic preforms, wherein the apparatus comprises a control device for controlling these heating sections, wherein the apparatus has an input device via which a user can predefine a set value for the individual heating zones, and a control device is provided which automatically actuates the individual heating elements taking account of a set value of at least one of the lamp power and a set value which is characteristic of the lamp power, and wherein a processor device automatically calculates whether and how many heating elements must be activated in which heating zone in response to an applied temperature specification by the user.

2. The apparatus according to claim 1, wherein the predefinable set values are absolute or relative percentage zone power levels.

3. The apparatus according to claim 1, wherein the predefinable set values are the energy levels introduced into at least one of the preform per zone and the preform temperatures to be achieved per zone.

4. The apparatus according to claim 1, wherein the processor device is suitable and intended for determining the optimal set values of the individual heating elements for achieving a maximally long service life of the lamps.

5. The apparatus according to claim 1, wherein at least one of the processor device and an algorithm determines the set values of the individual heating elements which are optimal for the most energy-efficient heating profile.

6. The apparatus according to claim 1, wherein the input device allows the input of a plurality of set values for the individual heating zones.

7. The apparatus according to claim 1, wherein the apparatus has a plurality of heating elements which are arranged successively along the transport path of the plastic preforms.

8. The apparatus according to claim 7, wherein the heating elements of each heating section can be controlled independently of each other.

9. The apparatus according to claim 1, wherein the apparatus has a first temperature measuring device which measures an actual temperature of the plastic preforms.

10. The apparatus according to claim 1, wherein the control device controls a power of the heating elements between at least two limit values.

11. The apparatus according to claim 1, wherein the apparatus comprises a second temperature measuring device for measuring a temperature of the plastic preforms.

12. The apparatus according to claim 1, wherein heating elements or groups of heating elements to be activated can be selected.

13. A method for heating plastic preforms, wherein a transport device transports the plastic preforms along a predefined transport path, wherein this transport device has a plurality of holding elements for holding the plastic preforms, and wherein at least one first heating section, which is arranged along the transport path, and at least one second heating section, which is arranged along the transport path downstream of the first heating section, heat the plastic preforms, wherein the heating sections each comprise a plurality of independently controllable heating elements which allow heating of the plastic preforms in several heating zones, lying above each other in the longitudinal direction of the plastic preforms, with a temperature profile which changes in the longitudinal direction of the plastic preforms, wherein a control device controls these heating elements, comprising the steps of: providing the apparatus with an input device via which the user can predefine a set value for a heating process, and with a processor device actuating the individual heating elements taking account of the set value, and actuating the individual heating elements taking into account a set value of at least one of the lamp power and a set value which is characteristic of the lamp power, and wherein a processor device automatically calculates whether and how many heating elements must be activated in which heating zone in response to an applied temperature specification by the user.

14. The method according to claim 13, wherein a temperature of the plastic preforms is measured for at least part of the time.

15. The apparatus according to claim 4, wherein the processor device has an algorithm which performs corresponding calculations.

16. The apparatus according to claim 1, wherein the processor device and/or the control device allows a change in transport speed of the plastic preforms.

17. The apparatus according to claim 1, wherein the heating sections are arranged stationarily and the plastic preforms are transported past these heating sections or heating elements.

18. The apparatus according to claim 1, wherein the apparatus has a temperature measuring device which measures the actual temperature of the plastic preforms and the processor device controls the heating of the plastic preforms on the basis of this measured temperature.

19. The apparatus according to claim 1, wherein an algorithm is provided which takes account of the fact that the lamp power lies in a specific range, so that the individual heating elements or lamps are operated under optimal operating conditions and a lower and/or an upper limit value is established for operating temperatures, and a lamp power is configured such that a lamp temperature moves inside this range.

* * * * *